Aug. 12, 1941.   E. E. ARNOLD   2,252,541
ELECTRIC STEAM GENERATOR
Filed Feb. 16, 1940   2 Sheets-Sheet 1
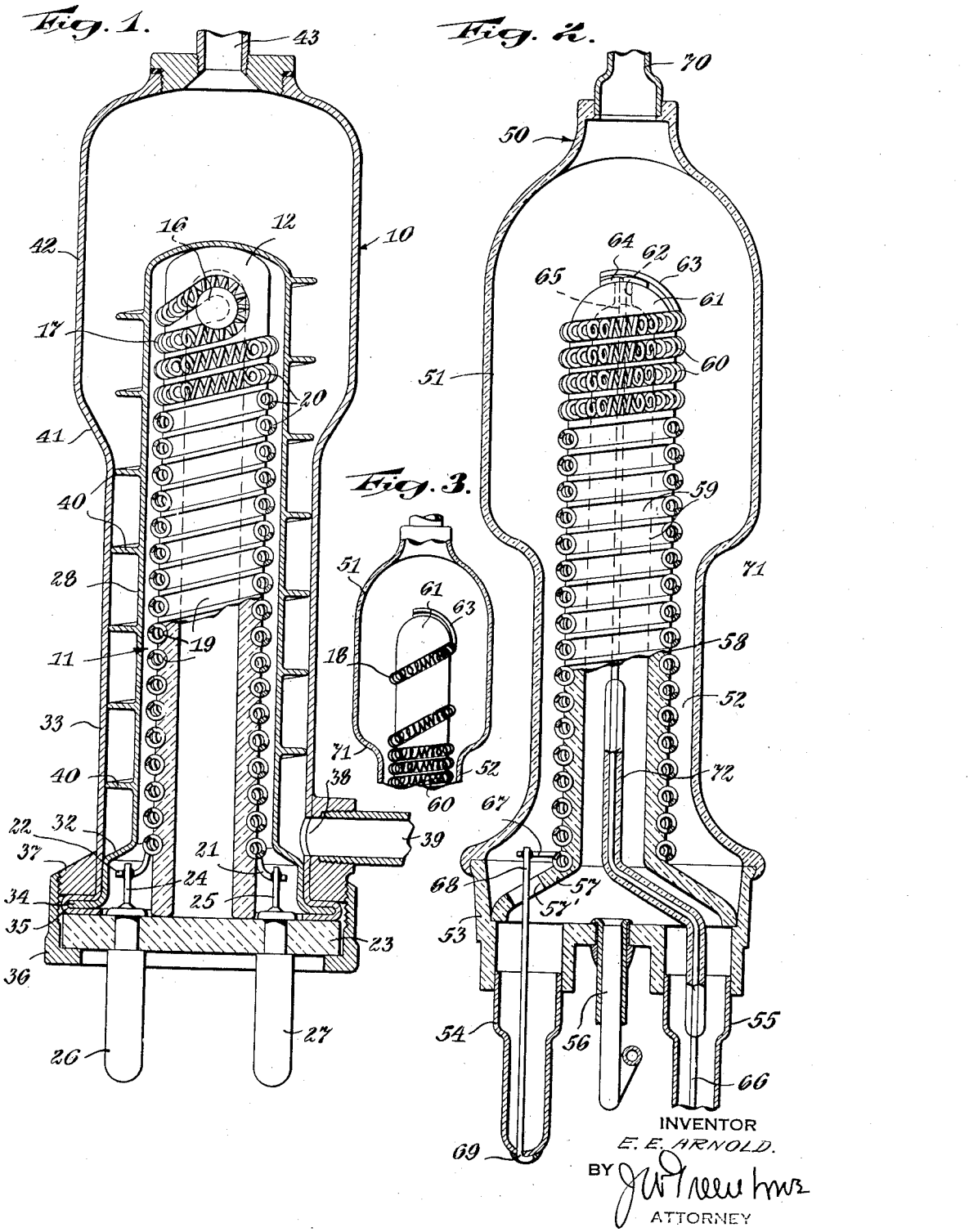
INVENTOR
E. E. ARNOLD.
BY
ATTORNEY Aug. 12, 1941.  E. E. ARNOLD  2,252,541
ELECTRIC STEAM GENERATOR
Filed Feb. 16, 1940  2 Sheets-Sheet 2
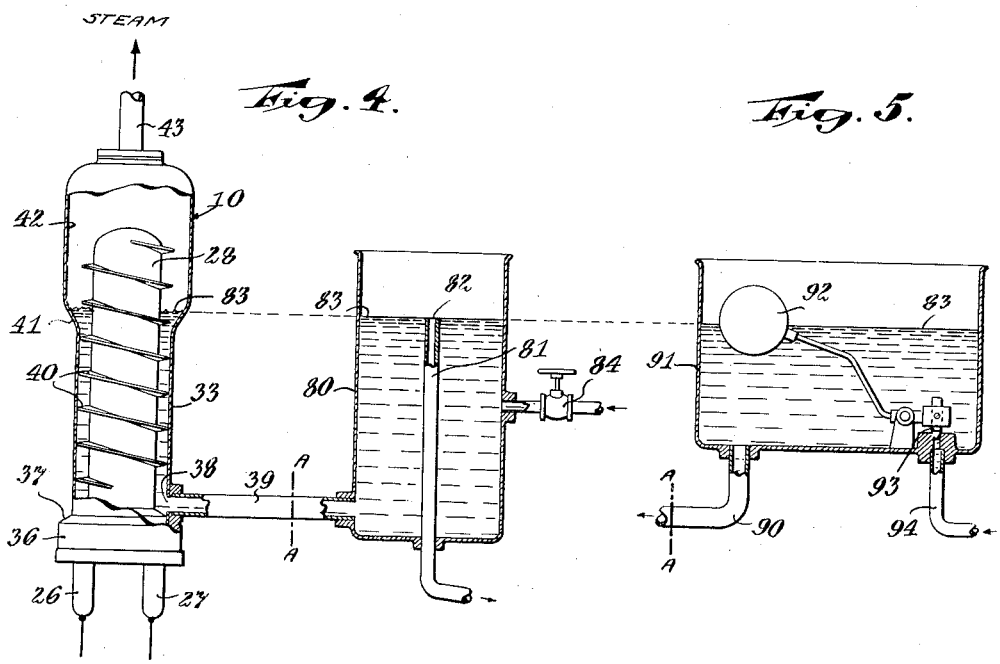
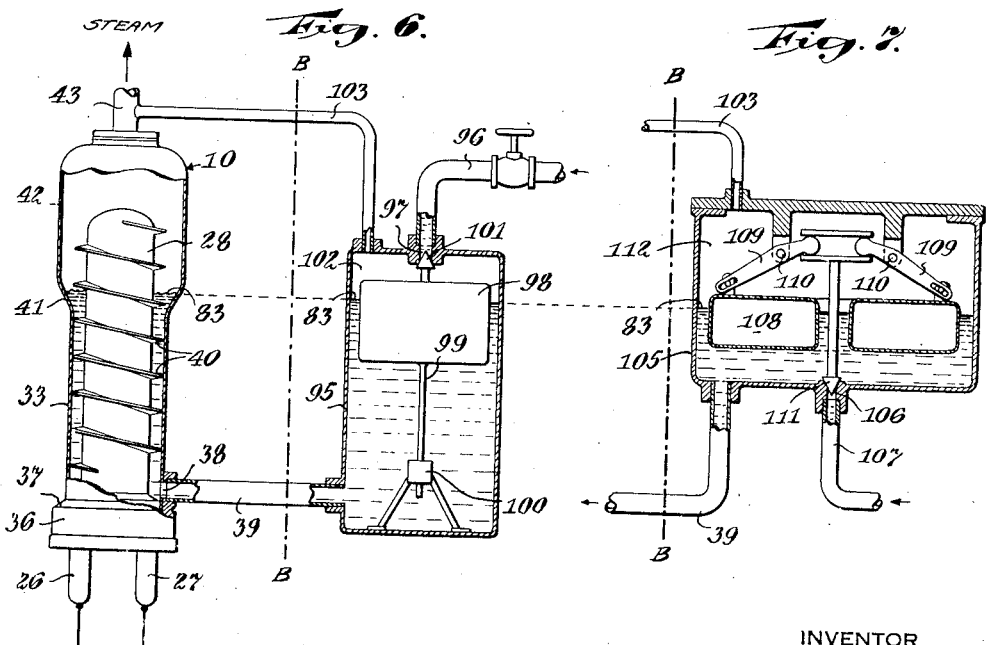
INVENTOR
E. E. ARNOLD.
BY
ATTORNEY Patented Aug. 12, 1941

2,252,541

UNITED STATES PATENT OFFICE 2,252,541

ELECTRIC STEAM GENERATOR

Edwin E. Arnold, Pittsburgh, Pa., assignor to Westinghouse Electric & Manufacturing Company, East Pittsburgh, Pa., a corporation of Pennsylvania Application February 16, 1940, Serial No. 319,215

9 Claims. (Cl. 219—39)

My invention relates to a steam generator and more particularly to an "instantaneous" continuously operable steam generator.

An object of my invention is to provide a continuous steam generator capable of delivering superheated steam in a minimum of time, such as 10 to 15 seconds, or even less, depending on initial temperature of water, after connecting the generator to a power supply.

A further object of my invention is to provide an "instantaneous" continuously operable steam generator capable of producing relatively large quantities of dry or superheated steam without having drops of moisture carried along with such steam.

A further object of my invention is to provide an "instantaneous" continuously operable steam generator comprising a water chamber and a relatively larger steam chamber having a heater positioned therein, whereby any moisture in the steam will be quickly removed therefrom, ensuring the delivery of dry or even superheated steam from the generator, depending upon adjustment of water and current supply for a given operator.

A further object of my invention is to provide an "instantaneous" continuously operable steam generator having an immersion heater adapted to be positioned within a relatively small volume of water so as to have a large percentage of contact area therewith to produce steam therefrom in a minimum time and with a minimum consumption of power, and adapted to be positioned within a relatively large volume of steam to supply the necessary amount of additional heat thereto to produce the desired dryness and degree of superheat thereof.

A further object of my invention is to provide a steam generator capable of producing a continuous flow of dry superheated steam and operating at substantially higher thermal efficiency than by ordinary means.

A further object of my invention is to provide a small "instantaneous" continuously operable steam generator capable of producing a continuous flow of dry superheated steam of a predetermined quality adapted for sterilizing purposes.

A further object of my invention is to provide means for automatically maintaining the desired water level in the steam generator.

Other objects and advantages of the invention will be apparent from the following description and drawings, in which:

Figure 1 is a cross-sectional view showing one embodiment of my invention as applied to an indirect heater type of steam generator.

Figure 2 is a cross-sectional view of a modification of my invention as applied to a direct immersion type of steam generator.

Figure 3 is a cross-sectional view illustrating a modification of the heater construction of Figure 2.

Figure 4 is a view, partly in cross-section and partly in elevation of means for automatically maintaining the water level in a steam generator.

Figure 5 is a modification of the means illustrated in Figure 4.

Figure 6 is a view, partly in cross-section and partly in elevation, of means for automatically maintaining the water level, and for discharging the steam under pressure.

Figure 7 is a modification of the means of Figure 6.

It will be noted that my invention is generic to the invention disclosed in the application of Karl Ehrgott, Serial No. 210,190, filed May 26, 1938, for "Electric steam generator."

My invention generically relates to the provision of a small and rapidly heated water portion in combination with an adjoining steam portion of the same container in which the steam is dried and superheated by the same heating means that transforms water into steam. The steam portion of the container is enlarged over that of the water portion to provide space for separation of water from the steam evolved, and 10 to 50% of the heating means is located in the steam chamber for drying and superheating the steam. The percentage of the heating means in the steam generator varies depending upon the degree of dryness and superheat desired. Preferably the percentage of the heating means in the steam chamber is approximately 20% of the total heating means.

I have applied my invention to both the indirect heater type and the direct immersion type for the production of dry and superheated steam.

In Figure 1 I have disclosed the indirect heater type embodying my invention. This generator has an envelope 10 preferably of metal and an inner heater assembly 11. This heater assembly preferably comprises a centrally elongated core 12 preferably of ceramic material, which, in its preferred embodiment, has a hollow center for the purpose of saving extra material and the heat that would be expended in heating this extra material.

This ceramic material may be of porcelain, but I prefer to utilize aluminum magnesium silicate because of its low expansion and resistance to thermal shock. The formula for this aluminum magnesium silicate is generally given as $2MgO-2Al_2O_3-5SiO_2$. The commercial material which I have found to be especially suitable is that sold under the trade name of "Alsimag 202." This core preferably has a cylindrical body 12 resting on a thick plate 23 of, preferably, insulating material. The central cylindrical portion 12 has helical grooves 19 thereon, in which is located the heater wire 20 in the form of helical coils. These grooves may be a symmetrical helix as shown, or may be a helix of progressively increasing pitch to provide for irregular heat distribution as may be desired.

The material of the heater wire may be that of any of the well-known heaters such as nickel chromium. The heating element is also preferably helically coiled to afford a maximum heating surface and to reduce the contact with the core to a minimum. The heater wire is shown as wound bifilar and has two connections 21 and 22 at opposite sides of the bottom of the casing and the wire is wound upwardly until its midportion is curled around a knob 16, preferably integral with the core. A similar knob on the opposite side may be used to help center and space the heater within the metal cover. The connections 24 and 25 extend through plate 23 to two prongs 26 and 27. These prongs may take any desired configuration to fit any desired socket.

In the form shown in Figure 1 the heater element is enclosed in a water tight casing or cover 28, such as stainless steel or copper. This cover 28 preferably fits closely over the top of the core 12, but spaced out of contact with the heater wire 20.

At the bottom portion, the cover 28 extends outwardly at 32 to make contact with the lower portion 33 of the metal casing. This cover preferably has a flange 34 bound between the turned-over edge 35 of the metal envelope. The casing and metal cover also rest upon and are supported by the insulating plate 23. Casing members 36 and 37 fit around the lower portion of the casing to prevent any shocks or jars from disturbing the arrangement of the parts. The lower portion 33 of the casing has an opening 38, which has a connection 39 to a water supply. It will be noted that the space between the metal cover 28 and the lower portion 33 of the case, is very small so that the relatively small volume of water will be quickly heated and changed to steam.

In order to provide a flow about the core, and to increase the heat transfer to the water, I preferably provide helical vanes 40, preferably integral with the metal cover 28. These helical ribs may be closely wound helical wire like garter springs for, in turn, spiraling around the heater cover and attached thereto by soldering or brazing in order to provide, not only a helically guided upward path for the liquid, but to provide maximum radiating surface for heat transfer. The metal casing 33 at a mid portion, slopes out at 41 into a larger diameter upper portion of the casing 42. This upper portion has a much larger volume than the water portion of the device in order to provide separation space for any droplets of water carried up by the evolution of the steam, and the heater wire has coils extending to this portion for the purpose of drying and super-heating steam in this chamber. The heating wire 20 has a certain portion 17 of its heating coils located in the steam chamber 42. The proportion of these coils may run from 10% to 50% of the total coils depending on the degree of dryness and super heating of the steam. I prefer to utilize about 20% of the coils for the steam chamber. An opening 43 and connection for steam may be made in the upper portion of the casing.

In Figure 2 I have disclosed a simplified form of the steam generator wherein the heating wire carrying current is exposed directly to the water in the lower restricted portion and to the steam in the upper enlarged portion of the casing.

In place of the metal casing 10, I have disclosed a glass casing 50 which may be of quartz or "Pyrex" glass. This glass casing has the enlarged upper steam chamber 51, and the smaller diameter water chamber 52. The bottom portion is preferably sealed to a thick glass 53 through which project prongs 54 and 55 of copper. Also preferably extending through this base 53 is an inlet 56 for water. Resting upon this glass base 53 is a core 57, preferably the same material as the core 12 in Figure 1. This core has opening 57' for the passage of water to the water chamber 52. This core has an elongated cylindrical portion 58 having helical grooves 59 upon which is wound the nickel chromium heater resistance wire 60, previously described.

The top portion of the core has a rounded top 61 having a conductor opening 62 therethrough. The resistance wire is singly wound around the core and the upper end has an extension 63 that is welded to a prepared end 64 of a conductor 65 that extends downwardly through the hollow central portion of the core and extends into one of the prongs 55 and has a portion 66 to make contact thereto. The lower portion of this conductor may be covered with glass 72 to increase the short circuit resistance to the other lead.

The other end of the heater wire at the lower portion of the core makes contact at 67 with the connector wire 68, which is connected in turn at 69 to the other prong 54.

A steam exit port 70 is preferably located at the upper end of the glass casing 51. The glass casing has an abrupt change in diameter at 71 between the lower portion 52 and the upper portion 51. The lower portion 52 is closely spaced about the core and heater wire thereon. This close spacing permits the very rapid heating of the relatively small volume of water therein, and the production of steam in a few seconds. The extension of the heater wire into the upper region 51 permits this steam to be dried and/or super-heated.

The degree of dryness and superheat of the steam desired will determine the proportion of the heater wire located in the enlarged steam chamber 51. In Figure 2 I have disclosed almost 50% of the heater wire located in the steam chamber. In the modification disclosed in Figure 3, there is a minimum of turns 18 in the steam chamber for drying the steam. In general I prefer to utilize about 20% of the heating unit for the purpose of drying and super-heating the steam.

The abrupt change in diameter of the metal or glass casing of Figure 1 or 2, indicates roughly the desired water level. It is desirable to provide means for automatically maintaining the water at different levels, especially if a metal casing is utilized. In Figures 4 to 7, I have illustrated various means for accomplishing this result. Figure 4 illustrates the steam generator casing 10 of Figure 1, with the metal cover 28 and its helical fins 40 surrounding the heater assembly.

The connection 39 may extend to a water container 80, having a central drain pipe 81 with its open top 82 located on a level with the desired height of the water level at the portion 41 of the steam casing. The water supply valve 84 may be turned on to constantly supply water to the container 80 at a rate that would maintain the water level up to the height 83 at least.

A more satisfactory arrangement is that in Figure 5, which has a pipe 90 to be attached at the line A—A to the similar line A—A of Figure 4. This pipe extends to a container 91 having the float 92 connected through a pivoted lever to a valve 93, to a connection 94 to a water supply. The float valve is adjusted so that the valves 93 are open and supply water whenever the water level in the container 91 falls below a level at 83 in the steam generator, and the float will close the valve whenever the water in the container 91 tends to rise above this water level.

It may be of special advantage to eject the steam under pressure and not to disturb this pressure by the influx of water. It may be especially desirable that the steam pressure does not push the water back in the supply pipes.

In Figure 6, I have disclosed a closed container 95 with the connection 39 similar to that of Figure 4, extending to the lower portion of the steam generator. The water supply comes from a pipe 96 entering the upper opening 97 into this closed container, and in the interior of this container is a float 98 arranged to move vertically under a rod extension 99 moving in a guide 100. When the water level 83 is reached by the water the opening 97 is closed by the valve 101 attached to the float 98. The upper portion 102 of the closed container 95 has a pipe connection 103 extending to the steam opening 43. This pipe 103 provides a means for balancing the pressure between the steam chamber 42 and the chamber 102 in the water reservoir 95. By use of the float valve and the balance pipe 103 the steam is expelled from the steam generator under pressure which is not disturbed by the influx of water and vice versa.

In Figure 7 I have illustrated a modification of the float valve in which the arrangement on the line B—B may be attached to the pipes 39 and 103 in Figure 6. This reservoir 105 is adapted to have an opening 106 to supply pipe 107 entering the lower portion of the casing. A ring float 108 has a lever connection 109, pivoted at 110 to depress a valve arrangement 111 to close the opening 106 when the desired level 83 is reached by the water. In case the water level is lowered below this level, the floats raise the valve arrangement 111 and water is taken into the reservoir.

A pipe 103 permits a pressure balance between the upper chamber 112 and the steam chamber 42 in the steam generator.

In Figure 1 it is apparent that I have disclosed a very sturdy steam generator which is adapted to supply steam very rapidly and which is constructed to supply this steam under pressure.

In Figure 2 I have disclosed a very economical instantaneous steam generator.

In Figures 4 to 7 of the drawings, I have disclosed means for automatically maintaining the water level in Figures 1 and 2.

Attention is especially directed to the feature of Figures 6 and 7 for producing steam under pressure, wherein the water supply is not affected by change in pressure of steam delivered.

Our test observations show that the ratio of heat represented in delivered steam to the heat equivalent of the electric energy applied is an efficiency over 90%.

The glass casing of Figure 2 may be applied to Figure 1 and the metal casing of Figure 1 may be applied to Figure 2. In fact it is apparent that many other modifications may be made in these embodiments without departing from the spirit and scope of the invention. Accordingly, I desire only such limitations of my invention as are necessitated by the spirit and scope of the following claims.

I claim:

1. A steam generator comprising an envelope adapted to contain water and steam, a heater positioned within the envelope and spaced therefrom, the lower portion of said heater being close to said envelope whereby water therebetween is rapidly heated, said spacing between said heater and said envelope abruptly increasing at a mid-portion of said heater whereby the water level is indicated at said mid-portion and an enlarged heated steam chamber formed in the upper portion of said envelope.

2. A steam generator comprising an envelope adapted to contain water and steam, a heater positioned within the envelope and spaced therefrom, the lower portion of said heater being close to said envelope whereby water therebetween is rapidly heated, said spacing between said heater and said envelope abruptly increasing at a mid-portion of said heater whereby the water level is indicated at said mid-portion, and an enlarged steam chamber formed in the upper portion of said envelope, and means for automatically maintaining the water level at said mid portion.

3. A steam generator comprising an envelope adapted to contain water and steam, a heater assembly positioned within said envelope, the lower portion of said heater assembly being close to said envelope, whereby water therebetween is rapidly heated, said heater assembly having helical vanes on said lower portion, whereby the water is circulated about said heater assembly, said envelope being enlarged in its upper portion to provide a steam chamber and means for automatically maintaining the water level at the bottom of said enlarged portion.

4. A steam generator comprising an envelope adapted to contain water and steam, an electric heater located within said assembly, the lower portion of said heater being close to said envelope whereby water therebetween is rapidly changed to steam, an enlarged chamber in the upper portion of said envelope for drying said steam, said heater having approximately 20% of its heat producing portion within said enlarged steam chamber.

5. A steam generator comprising an envelope adapted to contain water and steam, a heater positioned within the envelope and spaced therefrom, the lower portion of said heater being close to said envelope whereby water therebetween is rapidly heated, said spacing between said heater and said envelope abruptly increasing at a mid-portion of said heater whereby the water level is indicated at said mid-portion and an enlarged steam chamber formed in the upper portion of said envelope, said heater having 10% to 50% of its heat producing portion in said steam chamber.

6. A steam generator comprising, in combination, an envelope and an immersion heater adapted to be positioned therein, said heater including a core and a heating element wound on said core, said envelope including a water chamber portion for retaining water to be heated and an enlarged steam chamber for drying or superheating the steam, said heater having approximately 20% of its heating element in said enlarged steam chamber.

7. A steam generator comprising an envelope adapted to contain water and steam, a heater positioned within the envelope and spaced therefrom, the lower portion of said heater being close to said envelope whereby water therebetween is rapidly heated, said spacing between said heater and said envelope increasing at a mid-portion of said envelope whereby the water level is indicated at said mid portion, means for automatically maintaining the water level at said mid portion from a water supply whereby a steam chamber is formed in the upper portion of said envelope, and means for preventing the water supply being effected by changes in the steam pressure.

8. A steam generator comprising an envelope adapted to contain water and steam, a hollow core of insulating material in said envelope, a direct heater wire wound from the bottom to the top on the outside surface of said core, the return wire lead from the top of the core passing down through the hollow portion of said core, and an insulation coating on the return lead within said core to increase the short-circuit resistance to the other end portion of said wire.

9. A steam generator comprising an envelope adapted to contain water and steam, a hollow elongated core of insulation in said envelope, a socket in one portion of said envelope having two contacts, a connection from one of said contacts to one end of said core, a heater wire from said connection wound about said core to the other end of said core, a return connection from said heater wire passing through the hollow center of said core to the other contact in said socket, the return connection in said core having a coating of insulation.

EDWIN E. ARNOLD.